(12) United States Patent
George (10) Patent No.: US 6,612,257 B2
(45) Date of Patent: Sep. 2, 2003

(54) SQUIRREL-PROOF BIRD FEEDING APPARATUS AND METHOD

(76) Inventor: Robert A. George, 111 Merriam Rd., Broadalbin, NY (US) 12025

( * ) Notice: Subject to any disclaimer, the term of this patent is extended or adjusted under 35 U.S.C. 154(b) by 0 days.

(21) Appl. No.: 09/912,811

(22) Filed: Jul. 25, 2001

(65) Prior Publication Data

US 2003/0019435 A1 Jan. 30, 2003

Related U.S. Application Data (60) Provisional application No. 60/222,506, filed on Aug. 2, 2000.

(51) Int. Cl.[7] ............................................. A01K 39/01
(52) U.S. Cl. ..................................................... 119/57.9
(58) Field of Search ................................ 119/52.2, 52.3, 119/57.8, 57.9

(56) References Cited

U.S. PATENT DOCUMENTS

| | | |
|---|---|---|
| D103,963 S | 4/1937 | Butler |
| 2,261,326 A | 11/1941 | Atkisson et al. |
| 2,951,464 A | 9/1960 | Milliken |
| 3,399,650 A | 9/1968 | Goodman |
| 4,327,669 A | 5/1982 | Blasbalg |
| 4,434,745 A | 3/1984 | Perkins et al. |
| 4,486,110 A | 12/1984 | Kruckei et al. |
| 4,974,547 A * | 12/1990 | Graham ..................... 119/52.2 |
| 5,479,880 A | 1/1996 | Stuhr et al. |
| 5,490,480 A | 2/1996 | Dumond |
| 5,699,752 A * | 12/1997 | Wilkins ................... 119/51.03 |
| 5,711,247 A | 1/1998 | Henshaw |
| 5,722,344 A | 3/1998 | Rank |
| 5,740,758 A | 4/1998 | Damm |
| 5,894,813 A | 4/1999 | George |
| 6,386,142 B1 * | 5/2002 | Holscher et al. ......... 119/51.01 |

FOREIGN PATENT DOCUMENTS

| | | | |
|---|---|---|---|
| GB | 2146221 A * | 4/1985 | ................ 119/52.3 |
| GB | 2236468 | 10/1991 | |

* cited by examiner

*Primary Examiner*—Robert P. Swiatek
(74) *Attorney, Agent, or Firm*—Jay R. Yablon (57) ABSTRACT

A bird feeder includes a vessel for holding seeds. A removable access tunnel external to the vessel is coupled thereto at a seed opening in the vessel. The access tunnel, as well as a bar across a bottom portion of the access tunnel opening restricts access to seeds by other than birds. A removable seed cover for the opening held on by the access tunnel is made of a flexible material and includes a seed opening sized and shaped to restrict a number of seeds extractable on a given attempt.

92 Claims, 3 Drawing Sheets fig. 1 fig. 2 fig. 3

SQUIRREL-PROOF BIRD FEEDING APPARATUS AND METHOD

CROSS-REFERENCE TO RELATED APPLICATIONS

This application claims the benefit of U.S. Provisional Application No. 60/222,506, filed Aug. 2, 2000.

FIELD OF THE INVENTION

The present invention generally relates to bird feeders. More particularly, the present invention relates to reducing seed loss from bird feeders, and to enabling birds to feed while preventing squirrels from doing so.

BACKGROUND OF THE INVENTION

For some time, bird feeders have focused on the same core design; that is, a tube type vertical feeder holding the seed, with stick perches placed at spaced intervals along the length of the tube. Openings into the tube allow the birds, once perched, to access the seeds.

These bird feeders suffer a number of shortcomings. For example, when an attempt is made by a perched bird to obtain a seed, often more than one seed comes out. Since the bird can typically only take one seed at a time, this results in much waste After the seeds fall to the ground, they are often eaten by squirrels and other rodents. Depending on the type of seed, this waste can be an expensive proposition for bird enthusiasts. As another example, these types of feeders suffer from seed loss due to squirrels and other rodents. The openings tend to allow easy access to the seeds by the rodents, as well as encourage clogging from the entry of rain, snow and blowing debris.

Commonly-owned and invented U.S. Pat. No. 5,894,813 issued Apr. 20, 1999 provides a squirrel-proof bird feeding device comprising: a frame including a feed bed; a first screen, positioned above said feed bed; and a second screen, positioned about 0.75 inches to 1.5 inches above said first screen, said second screen having apertures from about 0.75 to 1.5 inches. It alternatively provides a squirrel-proof bird feeder that prevents squirrels from accessing the feed intended for birds, said bird feeder comprising: a frame including a feed bed for placing feed thereon; and a squirrel barrier positioned on said feed, said squirrel barrier including a first surface positioned adjacent said feed bed and a second surface positioned about 1.5 inches or less above said first surface, said second surface having openings of 1.5 inches or less for permitting a bird to place its head therethrough, whereby said squirrel barrier permits birds to gain access to the feed and prevents squirrels from gaining similar access due to the differences in facial characteristics between birds and squirrels.

While this feeder is largely effective for feeding birds while barring squirrels, in practice the seed in the feed bed is not restrained as securely as it might be, and squirrels which jump up and down on this feeder can actually vibrate it to shake some of the feed up off the feed bed and into a position where they can access it. In addition, this feeder is somewhat cumbersome to fill. Further, U.S. Pat. No. 5,894,813 does not disclose or suggest how to implement a squirrel-proof bird feeder in the form of the vertical or horizontal bird seed holding vessels that have long been popular among bird feeding enthusiasts.

OBJECTS OF THE INVENTION

Thus, a need exists for a bird feeder that reduces seed waste, undesired access to the seed by other than birds, and clogging.

In accordance with the above, it is desired to provide a bird feeder that reduces seed waste.

It is further desired to provide a bird feeder that reduces or eliminates undesired access to bird feed contained therein by other than birds, for example, squirrels.

SUMMARY OF THE INVENTION

Briefly, the present invention satisfies the need for a bird feeder that reduces seed waste by providing seed access through an opening sized and shaped to reduce the possibility of more than one seed being removable by a bird on a given attempt. A specially-designed access tunnel around the opening reduces unwanted access by squirrels and similar animals, as well as clogging.

The present invention provides, in a first aspect, a bird feeder. The bird feeder comprises a vessel for holding seeds. The vessel includes a seed opening therein sized and shaped to restrict a number of seeds extractable on a given attempt.

The present invention provides, in a second aspect, a method of feeding birds, comprising providing a bird feeder with seeds therein; and limiting access to the seeds through an opening sized and shaped to restrict a number of seeds extractable on a given attempt.

The present invention provides, in a third aspect, a bird feeder. The bird feeder comprises a vertical tube for dispensing seeds. The vertical tube includes a seed reservoir coupled to the vertical tube.

The present invention provides, in a fourth aspect, a bird feeder. The bird feeder comprises a vessel for holding seeds. The bird feeder also comprises a housing coupled to the vessel for seed dispensing. An opening in the housing for seed access faces downward.

The present invention provides, in a fifth aspect, a bird feeder. The bird feeder comprises a vessel for holding seeds. The bird feeder further comprises an access tunnel external to the vessel and coupled thereto at an opening thereof.

The present invention provides, in a sixth aspect, a bird feeder with a horizontal vessel for holding seeds.

In all aspects, the invention enables birds to access the bird feed while barring squirrels and other animals from doing so.

In all aspects, the invention comprises at least one seed opening enabling birds to remove said seed therethrough from behind said at least one seed opening; and at least one access opening comprising access opening dimensions thereof and separated from said seed opening by a separation length therebetween; wherein: said access opening dimensions are sufficiently small and said separation length is sufficiently large such that rodents outside said at least one access opening are prevented by said at least one access opening from reaching their mouths through said at least one access opening far enough to feed on seed behind said at least one seed opening; and simultaneously, said access opening dimensions are sufficiently large and said separation length is sufficiently small such that birds outside said at least one access opening are enabled to reach their beaks through said at least one access opening far enough to feed on said seed behind said at least one seed opening.

BRIEF DESCRIPTION OF THE DRAWING

The features of the invention believed to be novel are set forth in the appended claims. The invention, however, together with further objects and advantages thereof, may best be understood by reference to the following description taken in conjunction with the accompanying drawing(s) in which:

DETAILED DESCRIPTION OF THE INVENTION

The present invention reduces seed waste by providing specially-designed, covered access to seed used for bird feeding that reduces a number of seeds that can be removed on a given attempt, and that also serves to reduce or eliminate the likelihood of undesired access to the seed by other than birds (e.g., rodents, such as squirrels). Thus, bird feeders constructed in accordance with the present invention are "squirrel-proof," as that term is understood in the industry, without inclusion of the well-known baffles or hoods that have enjoyed popularity in the recent past.

Figures 1, 2, 3:
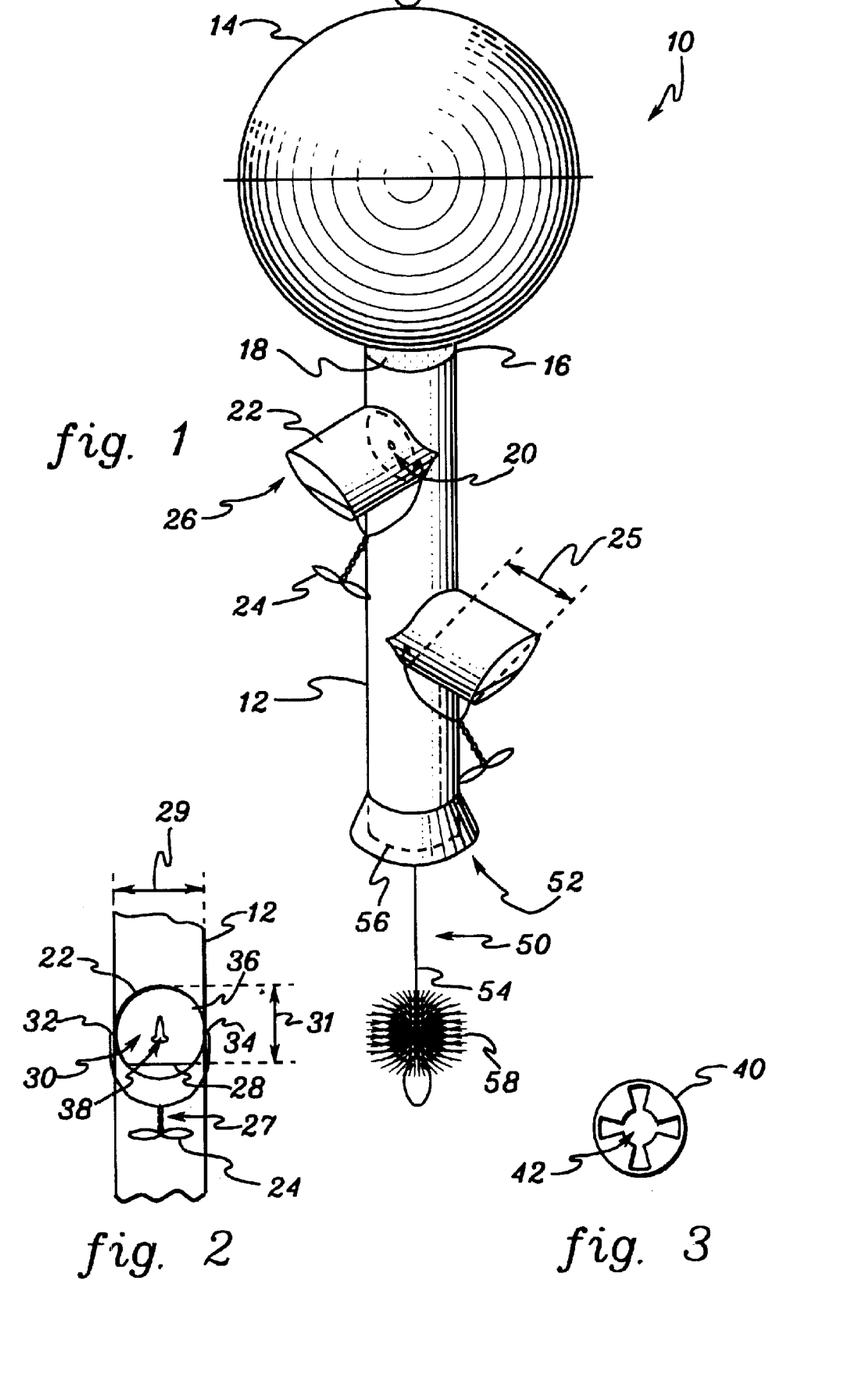
FIG. 1 is a perspective view illustrating a first example of a bird feeder in accordance with the present invention.
FIG. 2 is a plan view of an access tunnel of the bird feeder of FIG. 1 with a first example of a removable cover for the seed opening from the access tunnel into the main bird seed holding vessel.
FIG. 3 is a plan view depicting a second example of a removable, flexible seed cover for the access tunnel of FIG. 2.

FIG. 1 depicts a first example of a bird feeder 10 in accordance with the present invention. The bird feeder comprises a central, vertical bird seed holding vessel 12, preferably made of a material that resists being gnawed by rodents (e.g., metal or thick plastic) and will withstand adverse weather conditions without deteriorating (e.g., aluminum, stainless steel or thick plastic). Coupled to vessel 12 is a hopper (or reservoir) 14 for holding extra seed. Preferably, like vessel 12, reservoir 14 is made of a material that resists being gnawed by rodents and will withstand adverse weather conditions without deteriorating. Also preferably, reservoir 14 is shaped to deter rodents from climbing thereon (e.g., circular). Because typical tube-type bird feeders —which do not comprise reservoirs such as 14—experience seed depletion, the number of birds that can feed at a given time decreases. This is because as the seed level decreases, the openings into the tube higher up do not open to seed anymore. The reservoir of the present invention prevents or at least puts off this "loss" of feeding birds, which can be disappointing to the bird enthusiast and the birds, by maintaining a larger supply of seed in reservoir 14 above the tube that will drop down into the tube to replace lower seeds as they are depleted.

Optionally, coupling vessel 12 and reservoir 14 comprise a seed level monitoring means 16 such as, but not limited to, the illustrated area 16 through which the contents are visible, made of, for example, glass or thick clear plastic. Area 16 provides a visual cue to the bird enthusiast that the seed in the reservoir has been depleted. Alternatively, reservoir 14 itself could be made see-through (e.g., clear plastic), so long as the see-through material chosen resists gnawing by rodents. Access to bird seed 18 stored in the vessel is provided through at least one seed opening (e.g., seed opening 20, shown in phantom) therein. In this illustration the shape of seed opening is ovular or round (recognizing that a circle is a specialized case of an oval), though as will be seen later on, there are a range of configurations, e.g., shapes and sizes, for the seed opening which are suitable for various situations, particularly, in relation to the seed being used and the orientation of the seed opening (i.e., horizontal, vertical, or somewhere in between). Seed is stored behind the seed opening, and is accessed from outside the seed opening.

Coupled to vessel 12 proximate the seed openings are access tunnels, which, for the feeder of FIG. 1, are oriented substantially laterally from said vessel 12. However, this lateral orientation is not at all a limitation of the invention because, although certain orientations are preferred, any orientation is possible. For example, an access tunnel 22 is coupled proximate seed opening 20 and envelopes seed opening 20 therewithin as illustrated. Access tunnel 22 is preferably removable from vessel 12, but this is not required. Although two access tunnels 22 are shown in FIG. 1, it will be understood that a greater or lesser number could be provided. Access tunnel 22, like vessel 12 and reservoir 14, is also preferably made of a material that resists being gnawed by rodents and will withstand adverse weather conditions without deteriorating.

The access tunnels are preferably sized and shaped to enable perched birds (e.g., birds on perch 24) to access the vessel seed openings, while discouraging rodents from accessing same. For example, a separation length 25 of about 1 inch to about 1 ½ inches has generally been found to be accessible to many common birds, since the birds' heads are small enough and their beaks long enough to get through this 1 inch to about 1½ inch separation length 25 and extract seed through the seed opening at the inner end (nearest vessel 12) of the access tunnel. The access tunnels may also encourage birds to finish the seeds that are pulled from the seed opening but then dropped, as these seeds have a place to land and the bird has a nearby place to set a partially eaten seed for returning to and finishing, rather than eating a portion and dropping the remainder on the ground.

The shape and dimensions of an access opening on the outer portion of the access tunnel simultaneously bars entry by rodents. For example, outer portion 26 of access tunnel 22 is shaped with a slight overhang at the top, which does not affect access by a perched bird, but helps to keep out rain, snow and debris, and may also discourage rodents hanging upside down (often the case with, for example, squirrels) on bird feeder 10 from attempting to access the seed. Importantly, whatever the precise shape of outer portion 26, the rodent's mouth butts up against the outer portion of the access tunnel, so that the rodent can not get its tongue and teeth through the 1 inch to about 1 ½ inch separation length 25 in order to access seeds through the seed opening 20 at the inner end of the access tunnel.

The width of main vessel 12 preferably corresponds to the type of seed being provided. For example, not limitation, using vessel 12 as shown in FIG. 1 with a circular cross-section, the diameter is preferably about 1 ½ inches for black oil seed, while for thistle seed, it is preferably no smaller than about 1 inch in diameter.

As best shown in FIG. 2, access tunnel 22 preferably includes a barring structure 28 such as the illustrated bar across a lower portion of the access tunnel opening 30 thereof. Preferably, an access opening length 31 between barring structure 28 and a top of access tunnel 22 is between about ⅞ inch and about 1 ¾ inch to further prevent a rodent (e.g., a squirrel) from effectively getting its mouth inside the access tunnel, thereby further making it "squirrel-proof." Absent a barring structure, the total access opening length 31 of access tunnel 22 is similarly between about ⅞ inch and about 1 ¾ inch. A width 29 of the access tunnel is also preferably about ⅞ inch to about 1 ¼ inches. Length 31 and width 29 will together be referred to as the access opening dimensions of access opening 30, with the understanding any particular horizontal, vertical, or other orientation illustrated herein for the access tunnel does not limit the invention. That is, it is to be understood that any and all orientations for the access tunnel are considered to be within the scope of this disclosure and its associated claims. Barring structure 28 provides a further deterrent to access by rodents, yet does not interfere with a perched bird's access to the seed. Of course, the purpose for the barring structure 28 (keeping out rodents) might be achieved in other ways. For example, the access tunnel width could be made smaller. However, as a practical matter, this would also require a shorter length for the access tunnel, as birds tend to grow more reluctant to stick their heads far enough into the tunnel as it shrinks in width without also shrinking in length. And, barring structure 28 may comprise other suitable barring means besides a bar.

In the example of FIG. 2, perching means 24 comprises, for example, not limitation, plastic coated wire, similar to coat hanger wire. The wire can be shaped into the perch, but optionally, additionally serves the purpose of holding access tunnel 22 to vessel 12 via ends 32 and 34 inserted into small aligned openings in the tunnel and vessel. When the wire is optionally in a "braided" configuration to provide optional perch openings along it (e.g., perch opening 27), as shown in FIG. 2, an additional benefit is achieved. Perch opening 27 provides a location for a bird to place and hold a seed while cracking the shell and consuming the "meat" of the seed. The wire is flexible enough to allow removal of the access tunnel, while being stiff enough to hold it on the vessel. Of course, other arrangements are possible where the perch is entirely separate from the access tunnel, and has nothing to do with holding the access tunnel in place. This is merely one example of how to achieve the preferred removable aspect of the access tunnels. Most fundamentally, regardless of how perching means 24 is shaped, constructed, and configured, and optionally used to secure the access tunnel, perching means 24 provides a means for a bird to perch thereon with its head and beak proximate the outer portion of the access tunnel.

Figures 5, 6, 7, 8:
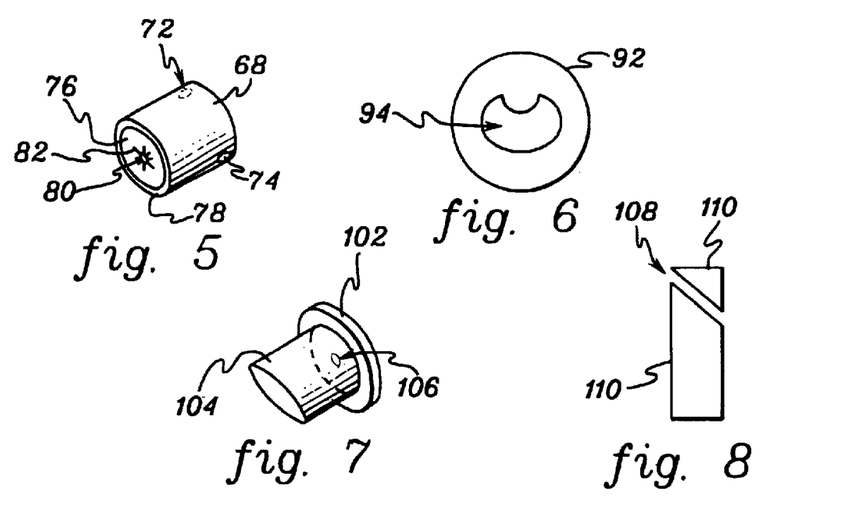
FIG. 5 is a perspective view of a removable cover with flexible seed cover for a seed opening of the bird feeder of FIG. 4, as well as a third example of a seed cover for the access tunnel of FIG. 2.
FIG. 6 is a plan view depicting a fourth example of a removable, flexible seed cover for the access tunnel of FIG. 2.
FIG. 7 is an exploded view of the cap of the bird feeder of FIG. 4.
FIG. 8 is a cross-sectional view of one end face of the bird feeder of FIG. 4.

Also shown in FIG. 2 is seed cover 36 for seed opening 20 in vessel 12. The seed cover is preferably made of a flexible material, such as, for example, plastic. The seed opening is designed to restrain the seed so as to keep seeds from falling out through the seed opening on their own, and so as to minimize the number of seeds that are removed therethrough on any given attempt (e.g. peck) by a bird to remove the seed. The cover includes a seed opening 38 sized and shaped as a "keyhole" to minimize a number of seeds that can be removed from the vessel on any given attempt, e.g., any given peck, by a perched bird. In this case, the seed opening 38 is sized and shaped particularly for smaller type seeds, such as, for example, thistle seeds. Another example is presented in FIG. 3. FIG. 3 depicts a seed cover 40 with a seed opening 42 particularly sized and shaped with an ovular center region encircled by a plurality of "flanges," used for larger type seeds, such as, for example, black oil seeds. Shown in FIG. 6 is still another example of a seed cover 92 with a seed opening 94 particularly sized and shaped in a "part-moon" for larger seeds, such as, for example, black oil seeds. Although a modular, removable seed cover is preferred, which allows the size and shape of the seed opening to be changed at will in accordance with the particular seed being used for feed, it will be understood that the seed cover need not be removable, and could, for example, simply be part of the main vessel.

Returning to FIG. 1, one example of making vessel 12 and reservoir 14 refillable will now be provided. Bird seed holding vessel 12 is closed to hold seed 18 therein through the use of a plunger 50 (i.e., a capping means) inserted into main vessel opening 52. Having the opening to the vessel and reservoir point to below helps reduce water and debris entering. Plunger 50 comprises a head 56 and an optional handle 54. Handle 54 may comprise, for example, not limitation, heavy gauge wire, while head 56 may comprise, for example, not limitation, foam rubber. In addition, plunger 50 may comprise a brush 58 for cleaning debris from the inside of vessel 12. To fill vessel 12 and reservoir 14, the entire bird feeder 10 is inverted relative to the illustration of FIG. 1, plunger 50 is removed, feed is poured into main vessel opening 52, plunger 50 is reseated to hold the seed inside, and entire bird feeder 10 with seed inside is again inverted and thereby restored to the orientation of FIG. 1.

Figure 4:
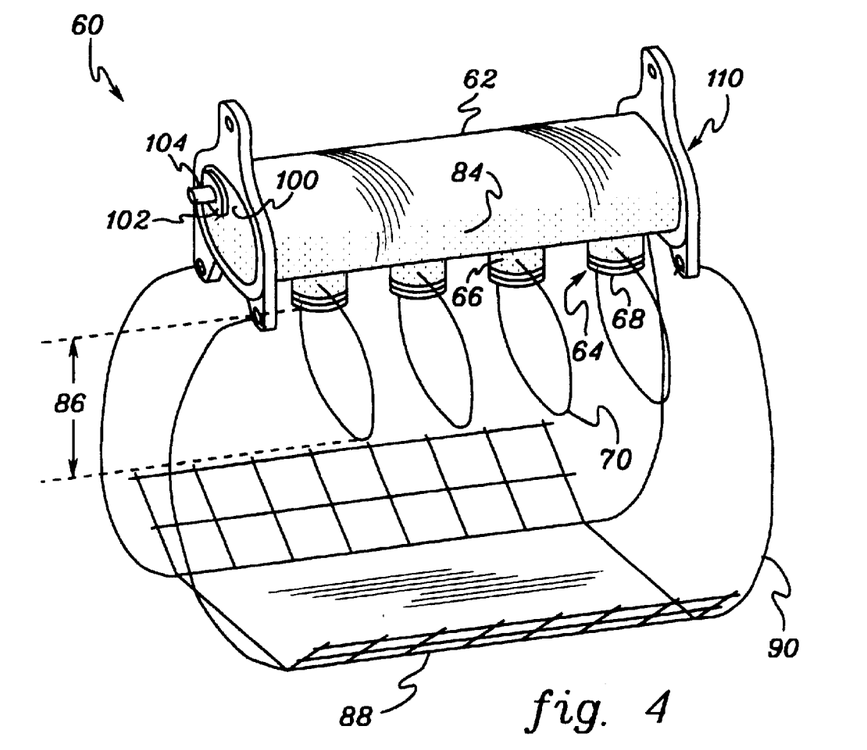
FIG. 4 is a perspective view depicting a second example of a bird feeder in accordance with the present invention.

FIG. 4 depicts another example of a bird feeder 60 in accordance with the present invention. Bird feeder 60 comprises a horizontal bird seed holding vessel 62. Vessel 62 is preferably made of a material that resists being gnawed by rodents and will withstand adverse weather conditions without deteriorating, for example, aluminum or thick plastic. Coupled to an underside of the vessel are a plurality of access tunnels (e.g., access tunnel 64), similar to the access tunnels of FIG. 1, but with differences stemming from their downward orientation. Access tunnel 64 comprises a section 66 protruding out from vessel 62. A cover 68 is placed over access tunnel 64. A hanging perch 70 made of, for example, optionally plastic coated wire holds the cover on section 66 by placing each end into aligned holes in section 66 and cover 68 (see holes 72 and 74 in FIG. 5). But again, most fundamentally, perch 24 provides a means for a bird to perch thereon.

Less preferred, though still within the scope of the invention, the access tunnels can also be upwardly oriented, or indeed, given any desired orientation.

The main purpose behind cover 68 will be described with reference to FIG. 5. Depicted in FIG. 5 is an exploded view of cover 68 holding a seed cover 76 in place via lip 78. Seed cover 76 comprises a seed opening 80 with an ovular center region encircled by a plurality of slits (e.g., slit 82) particularly sized and shaped for smaller seeds, such as, for example, thistle seeds. The downward-facing nature of the access tunnel/seed cover requires a very small seed opening (e.g., about 1/16 inch in diameter), as gravity assists the birds in removing the seed. The downward-facing nature of the access tunnel/seed cover also prevents rain and snow from entering. The slits in the seed cover provide some "give," for example, if a seed is sideways as it is being removed by the bird. While seed opening 38 in seed cover 36 of FIG. 2 could be used, this is less preferred since seeds could fall out and/or several at a time could be extracted by a bird on a given attempt.

Since seed cover 76 and seed opening 80 restrict the number of seeds that can be removed on a given attempt, and also significantly reduce the chance of seeds falling out on their own, a vertical access arrangement is possible. Cover 68 is preferably made of a material that resists being gnawed by rodents and will withstand adverse weather conditions without deteriorating, for example, aluminum or thick plastic. Cover 68 being optionally separate from section 66 allows seed cover 76 to be removable and changeable to match with the type of seed being provided, as discussed above with respect to FIGS. 2 and 3. Preferably, a distance 86 between the seed covers and their respective perch is about 3½ to about 4 inches. If perching distance 86 is too short for the birds attempting to be fed, then they cannot access the seeds. Likewise, if perching distance 86 is too long, the birds also will not be able to reach the seeds, and typically will not stretch to reach them. Fundamentally perching distance 86 is chosen optimize the ability of birds to comfortably access seed through the seed openings.

Of course, other arrangements for the access tunnel, seed cover and perch are possible. For example, the seed cover need not be removable. In that case, the seed cover could be integrated into section 66. As another example, seed cover 76 could be integrated into cover 68, and cover 68 made changeable for the seed being used. As still a further example, cover 68 could screw onto section 66, rather than being held on by the perch. These, and other variations, will be obvious to someone of ordinary skill and are considered to be within the scope of this disclosure and its associated claims.

Returning again to FIG. 4, bird feeder 60 further comprises on face 100 of vessel 62 capping means 102 (e.g., a screw cap) covering an opening (not shown) into vessel 62 for filling vessel 62 with seed. Attached to cap 102 is a hood 104 for keeping rain, snow and flying debris away from a small air opening (106, FIG. 7) in the cap. Opening 106 together with an opening 108 on face 110 (similar to face 100) allow the seed to "breathe" and prevent moisture build-up inside vessel 62. As shown in FIG. 8, opening 108 is angled downward to prevent entry of rain, snow and other debris. Preferably, as earlier noted in connection with element 16, a level of seed 84 can, in some manner, be discerned, using seed level monitoring means. For example, part or all of vessel 62 could be made of thick, clear plastic. Alternatively, part or all of vessel 62 could be made of, for example, aluminum and include a thick, clear plastic or glass window therein.

Optionally, bird feeder 60 includes a tray 88 for catching any stray seeds or partially eaten seeds that may fall, thereby further reducing waste. Tray 88 is coupled to vessel 62, for example, by heavy gauge wire (e.g., wire strand 90).

While several aspects of the present invention have been described and depicted herein, alternative aspects may be effected by those skilled in the art to accomplish the same objectives. For example, access tunnels 22 and 64 could be made removable using male/female components on the tunnels and vessels 12 and 62.

Figures 9, 10, 11:
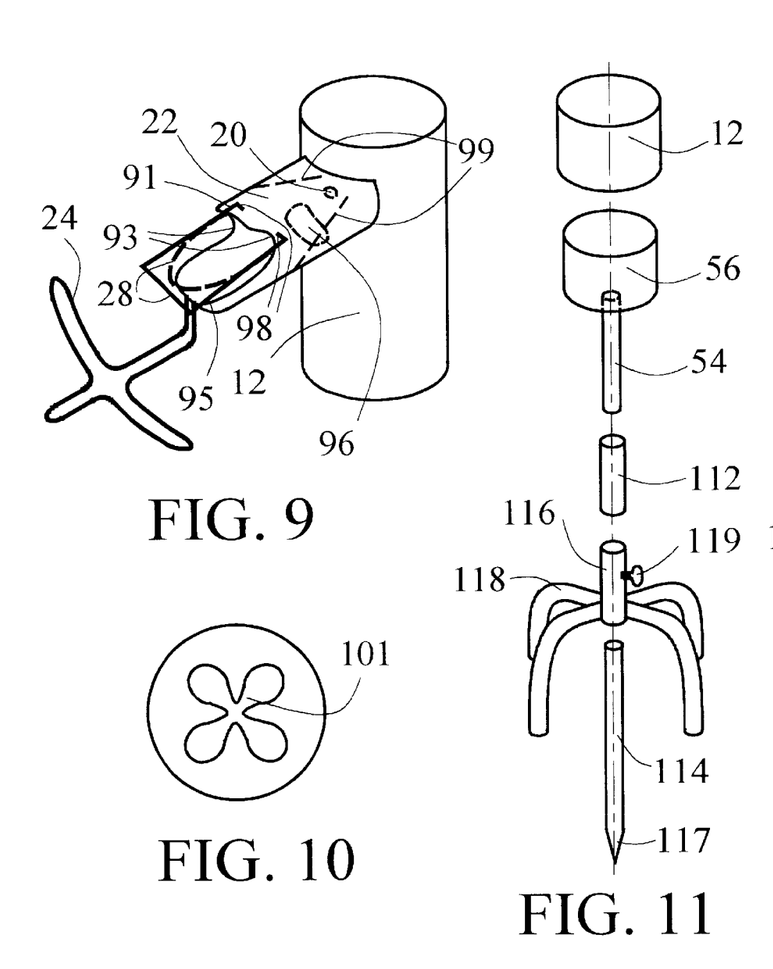
FIG. 9 is a perspective view of an example of an alternative configuration for the access tunnel in accordance with the present invention.
FIG. 10 is a plan view of an example of another alternative for the seed opening.
FIG. 11 is an exploded perspective view of an example of a ground stand used in conjunction with the invention.

FIG. 9 shows an alternative embodiment for access tunnel 22. In this embodiment, access tunnel 22 comprises an upper protrusion 91, a lower protrusion 95, and a pair of side, bird-viewing recesses 93. This embodiment of access tunnel 22 further comprises an alternative configuration for barring structure 28 as well as a dropped seed aperture 96. Also illustrated is seed opening 20, as well as an alternative embodiment for perching means 24.

In particular, smaller birds, when feeding at a bird feeder 10 or 60 with access tunnels 22, tend to stick their heads part way into access tunnels 22, thus obscuring the birds' heads from being viewed. While is important to continue to bar access by rodents such as squirrels, it is also desirable to be able to view the heads of the feeding birds.

Thus, bird-viewing recesses 93 allow the birds' heads to be viewed while they are feeding, while upper protrusion 91 and lower protrusion 95 jut out enough to still bar the squirrel from feeding. Note that lower protrusion 95, preferably, protrudes slightly further than upper protrusion 91, (or, alternatively, vice-versa) but that this is optional, not required. Such a preferred configuration makes it particularly difficult for squirrels to feed, since by making one protrusion longer than the other, the squirrel is jabbed by the longer protrusion, thus adding an unpleasant, further deterrent to its efforts to feed.

Dashed lines 99 are used schematically to illustrate yet another alternative configuration for access tunnel 22 in which access tunnel 22 is tapered (or funneled) so as to be wider toward the access opening and narrower back toward seed opening 20. While a bird's beak can easily navigate such a tapered region, this adds yet another obstacle to rodents.

In the illustrated alternative configuration for optional barring structure 28, a bar for example, comprising the illustrated rectangular shape shown in solid line or the partial circular or ovular curvature (recognizing that a circle is a special case of an oval) shown in broken line, protrudes about as far as, or slightly farther than, lower protrusion 95. It is also quite helpful for barring structure 28 comprise a pair of barring nubs 98 as shown, which protrude into the interior of access tunnel 22 as shown. Barring nubs 98 add yet another obstacle to rodents attempting to reach the feed behind the seed opening, and effectively reduces the access opening dimensions of the access tunnel. Barring structure 28 preferably reaches its maximum protrusion approximately ⅓ of the way up from lower protrusion 95 toward upper protrusion 91, although it can reside anywhere greater than or equal to ¼ of the way up, less than or equal to ¾ of the way up, and preferably less than or equal ½ of the way up. This of course provides a further physical bar to squirrels. But, it also provides a comfortable means for a bird perched on perch 24 to obtain a claw-hold while so-perched, which makes it even easier for the bird to feed. Particularly, birds will feed in this configuration by resting on the perch while also holding barring structure 28. In this manner, barring structure 28 serves a dual purpose of barring squirrels and providing a better claw-hold for birds.

Perching means 24, which, as noted earlier, can comprise a wide range of materials and have a wide range of configurations within the scope of the invention, is in this configuration placed in such position relative to barring structure 28 so as to optimize the ease with which a bird can perch while establishing a claw-hold to hold itself in place. Depending on the size and character of the birds to be fed, the relative configuration among perch 24, barring structure 28, and access tunnel 22 may be suitably varied in ways that will be obvious to someone of ordinary skill within the scope of this disclosure and its associated claims.

Finally, dropped seed aperture 96 is used to enable some of the seeds dropped by birds to fall through access tunnel 22 to the ground, so these seeds to not attract rodents to the feeder. Particularly, without dropped seed aperture 96, dropped seeds can accumulate (pool) in access tunnel 22 in a location accessible to rodents, which is undesirable.

FIG. 10 is a plan view of an example of another alternative for a seed opening 101 earlier designated in several configurations as 20, 38, 42, 80, and 94. This example 101 of a seed opening is shaped substantially like a cloverleaf, and is particularly suitable to prevent larger, black oil seeds from falling through the seed opening while birds are feeding.

Figure 12:
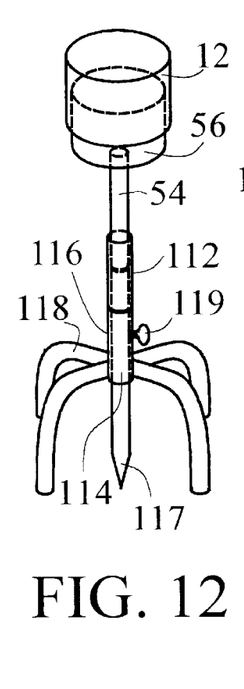
FIG. 12 is a perspective view illustrating the exploded components of FIG. 11 once they are assembled together.

FIGS. 11 and 12 illustrates a ground feeder stand used in conjunction with the invention. In particular, rather than hang feeder 10 or 60 or a similar feeder employing the inventive principles herein disclosed from a tree or elevated structure (with is often done to avoid squirrels), it is desirable to place the feeder at eye level, supported by a surface below the feeder such as the ground or planks of a wooden deck.

Referring to FIGS. 11 and 12, the brush 58 of FIG. 1 is removed or eliminated. Once plunger head 56 is inserted into the lower end of vessel 12, handle 54 thereof is inserted into an upper end of a connector means 112 such the illustrated connector sleeve, a ground peg 114 is slid through a peg sleeve 116 of a feeder stand 118 with at least three legs thereof and tightened in place using securing means 119 thereby establishing a base structure comprising the feeder stand 118 and the ground peg 114 secured thereto, and an upper end of ground peg 114 is inserted into a lower end of connector sleeve 112, all as illustrated. This yields the configuration of FIG. 12. Ground peg 114, is preferably tapered 117 at a lower end thereof, so that it can easily be stuck into the ground, or can be secured, for example, between the planks of a wooden deck. When ground peg 114 is slid through peg sleeve 116 of feeder stand 118 and then tightened using securing means 119, it is tightened in a position so that it dips below the illustrated (unnumbered) legs of feeder stand 118, thus allowing the feeder and stand configuration of FIG. 12 to be firmly planted into the ground or on the deck via the tapered 117 end of ground peg 114, of course, this is one example of many ways in which one might secure a feeder to the ground or a deck in accordance with the invention.

Figure 13:
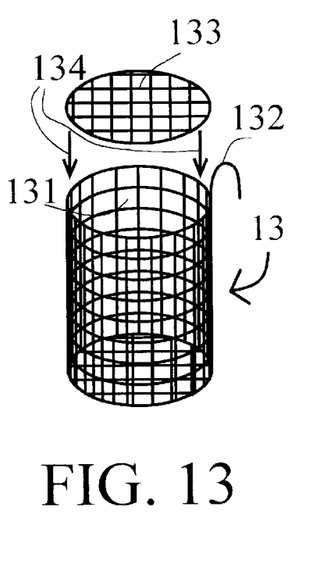
FIG. 13 is a perspective view of a squirrel-proof suet feeder in accordance with the invention.

FIG. 13 is a perspective view of a squirrel-proof suet feeder 130 in accordance with the invention. Suet feeder 130 comprises a simple wire cage (or container) with suet feeder openings 131 between the wires that are to small for a squirrel to gnaw through, but large enough for a bird's beak to peck through. Suet, an animal fat particularly attractive to woodpeckers, is stuffed into suet feeder 130 and packed tightly. This makes the suet accessible for pecking, but the chosen size of the suet feeder openings 131 combined with the physical nature of animal fat makes it difficult for rodents to gnaw through suet feeder openings 131. Then, an optional cover 133 is moved and secured 134 to enclose the suet, or suet feeder 130 is placed in such a way that access to the top opening is blocked). Finally, suet feeder attachment means 132, illustrated schematically by a hook but not limited thereto and encompassing any apparatus known or which may become know in the art to facilitate the attachment of suet feeder 130 to a fixed location, are used to attach suet feeder to a selected location of feeder 10 or 60, or to another support nearby the feeder.

While FIGS. 1 and 4 illustrate particular examples of seed holding vessels 12 and 62 that can be used to held seed, it is to be clearly understood that the size and shape of the vessel selected for any particular bird feeder implementation can be widely varied, while the seed openings and access tunnels can then be associated with the seed holding vessels in any manner of position, combination, orientation, and configuration, within the scope of this disclosure and its associated claims.

Particularly, while a number of novel and non-obvious features are disclosed and claimed herein, what is most important, irrespective of feeder configuration or the configuration of the seed openings and access tunnels, is that the access opening dimensions of the access tunnels be sufficiently small and the separation length of these access tunnels from the seed openings be sufficiently large such that rodents outside the access openings are prevented by the access openings from reaching their mouths far enough to feed on seed behind the seed openings; and simultaneously, that the access opening dimensions be sufficiently large and the separation length be sufficiently small such that birds outside the access openings are enabled to reach their beaks far enough to feed on the seed behind the seed openings.

While only certain preferred features of the invention have been illustrated and described, many modifications and changes will occur to those skilled in the art. It is, therefore, to be understood that the appended claims are intended to cover all such modifications and changes as fall within the true spirit of the invention.

I claim:

1. A bird feeding apparatus, comprising:
   at least one seed opening enabling birds to remove said seed therethrough from behind said at least one seed opening; and
   at least one access opening comprising access opening dimensions thereof and separated from said seed opening by a separation length therebetween;
   wherein:
      said access opening dimensions are sufficiently small and said separation length is sufficiently large such that rodents outside said at least one access opening are prevented by said at least one access opening from reaching their mouths through said at least one access opening far enough to feed on seed behind said at least one seed opening; and
      simultaneously, said access opening dimensions are sufficiently large and said separation length is sufficiently small such that birds outside said at least one access opening are enabled to reach their beaks through said at least one access opening far enough to feed on said seed behind said at least one seed opening.

2. The apparatus of claim 1, further comprising at least one access tunnel, said at least one access tunnel:
   comprising said at least one access opening; and
   enveloping said at least one seed opening.

3. The apparatus of claim 2, wherein:
   said separation length is greater than approximately one inch; and
   said separation length is less than approximately one and one half inches.

4. The apparatus of claim 2, said access opening dimensions comprising an access opening width and an access opening length thereof, wherein:
   said access opening width is greater than approximately seven-eighths of an inch;
   said access opening width is less than approximately one and one quarter inches;

said access opening length is greater than approximately seven-eighths of an inch; and said access opening length is less than approximately one and three quarter inches.

5. The apparatus of claim 2, said at least one access tunnel further comprising:

a barring structure;

said barring structure:

reaching a point of maximum protrusion sufficiently distant from said seed opening to additionally prevent said rodents from reaching their mouths through said at least one access opening far enough to feed on seed behind said at least one seed opening.

6. The apparatus of claim 5, said access opening dimensions comprising an access opening length thereof, wherein:

said point of maximum protrusion is greater than approximately one-quarter of the way from a first end of said access opening toward a second end of said access opening along said access opening length; and said point of maximum protrusion is less than approximately three-quarters of the way from said first end of said access opening toward said second end of said access opening along said access opening length.

7. The apparatus of claim 5, further comprising:

perching means for at least one bird to perch thereon, said perching means:

positioned relative to said access tunnel such that a bird, while perched thereon, can reach its beak through said at least one access opening of said at least one access tunnel far enough to reach said at least one seed opening and remove said seed;

wherein:

said barring structure is positioned relative to said perching means and said access tunnel such that a bird, while perched on said perching means, can also hold onto said barring structure.

8. The apparatus of claim 5, wherein:

said barring structure comprises a substantially partial rectangular shape.

9. The apparatus of claim 5, wherein:

said barring structure comprises a substantially partial oval shape.

10. The apparatus of claim 2, further comprising:

perching means for at least one bird to perch thereon, said perching means:

positioned relative to said access tunnel such that a bird, while perched thereon, can reach its beak through said at least one access opening of said at least one access tunnel far enough to reach said at least one seed opening and remove said seed.

11. The apparatus of claim 2, further comprising a seed holding vessel for containing said seed behind said at least one seed opening.

12. The apparatus of claim 11, wherein:

said seed holding vessel is substantially vertically oriented; and said at least one access tunnel is substantially laterally oriented.

13. The apparatus of claim 12, further comprising:

capping means for maintaining said supply of said seed within said seed holding vessel;

wherein:

said seed holding vessel further comprises a main vessel opening;

said capping means is removed from said main vessel opening for introducing a supply of said seed into said seed holding vessel through said main vessel opening; and said capping means is secured to said vessel for so-maintaining said supply of said seed within said seed holding vessel.

14. The apparatus of claim 11, further comprising ground stand means for supporting said vessel from a surface below said vessel.

15. The apparatus of claim 14, said ground stand means comprising:

a feeder stand comprising at least three legs;

a ground peg movable relative to said feeder stand;

securing means for securing said ground peg relative to said feeder stand; and connector means for connecting said vessel to a base structure comprising said feeder stand and said ground peg so-secured thereto.

16. The apparatus of claim 11, said access tunnel further comprising:

removal and attachment means for removing and attaching said access tunnel relative to said seed holding vessel, at will.

17. The apparatus of claim 11, further comprising:

a first seed cover comprising a first removable seed opening;

first removal and attachment means for removing and attaching said first seed cover relative to said seed holding vessel, at will;

a second seed cover comprising a second removable seed opening configured differently from said first removable seed opening; and second removal are attachment means for removing and attaching said second seed cover relative to said seed holding vessel, at will;

wherein:

for a given feeding situation, the seed covers are interchangeable with one another to accommodate variations in the seed to employee variations in the birds to be attracted to the feeder.

18. The apparatus of claim 11, further comprising:

seed level monitoring means for monitoring a level of seed remaining in said seed holding vessel.

19. The apparatus of claim 11, wherein:

said at least one access tunnel is located substantially outside said seed holding vessel.

20. The apparatus of claim 2, further comprising a reservoir connected to said seed holding vessel for maintaining an additional supply of said seed in position to replace depleted seed.

21. The apparatus of claim 2, wherein said at least one access tunnel is substantially laterally oriented.

22. The apparatus of claim 2, said access tunnel further comprising a dropped seed aperture for preventing seeds dropped by said birds from pooling in said access tunnel in a location accessible to said rodents.

23. The apparatus of claim 2, wherein:

said at least one seed opening comprises a size and shape thereof for:

restraining seed from falling out through said seed opening; and minimizing a number of seeds from among said seed which can be removed by a bird on a given seed removal attempt.

24. The apparatus of claim 2, wherein:
said at least one seed opening comprises a substantially oval shape.

25. The apparatus of claim 2, wherein:
said at least one seed opening substantially comprises a keyhole shape.

26. The apparatus of claim 2, wherein:
said at least one seed opening substantially comprises an oval-shaped center region encircled by a plurality of flanges.

27. The apparatus of claim 2, wherein:
said at least one seed opening substantially comprises an oval-shaped center region encircled by a plurality of slits.

28. The apparatus of claim 2, wherein:
said at least one seed opening comprises a substantially part-moon shape.

29. The apparatus of claim 2, wherein:
said at least one seed opening comprises a substantially cloverleaf shape.

30. The apparatus of claim 2, further comprising:
at least one barring nub protruding into an interior of said access tunnel.

31. The apparatus of claim 2, wherein:
said access tunnel is tapered to be wider toward said access opening; and
said access tunnel is tapered to be narrower toward said seed opening.

32. The apparatus of claim 2, said access tunnel comprising:
at least one protrusion;
said at least one protrusion:
reaching a point of maximum protrusion sufficiently distant from said seed opening to additionally prevent said rodents from reaching their mouths through said at least one access opening far enough to feed on seed behind said at least one seed opening; and
at least one bird viewing recess;
said at least one bird viewing recess:
recessed relative to said protrusion for viewing a head of a bird while said bird is feeding.

33. The apparatus of claim 2, further comprising a suet feeder, said suet feeder comprising suet feeder openings; wherein:
said suet feeder openings are sufficiently large to enable birds to reach their beaks through said suet feeder openings and feed on suet contained by said suet feeder; and
simultaneously, said suet feeder openings are sufficiently small to prevent rodents from reaching their mouths through said suet feeder openings and feeding on said suet contained by said suet feeder.

34. The apparatus of claim 2, wherein:
said separation length is greater than approximately one inch.

35. The apparatus of claim 2, said access tunnel comprising:
at least one protrusion;
said at least one protrusion:
reaching a point of maximum protrusion sufficiently distant from said seed opening to additionally prevent said rodents from reaching their mouths through said at least one access opening far enough to feed on seed behind said at least one seed opening.

36. The apparatus of claim 1, further comprising:
a first surface comprising said at least one seed opening;
a second surface comprising said at least one access opening.

37. A method for feeding birds while barring rodents from feeding, comprising the steps of:
providing at least one seed opening enabling birds to remove said seed therethrough from behind said at least one seed opening;
further providing at least one access opening comprising access opening dimensions thereof and separated from said seed opening by a separation length therebetween;
preventing rodents outside said at least one access opening from reaching their mouths through said at least one access opening far enough to feed on seed behind said at least one seed opening, using said access opening, by making said access opening dimensions sufficiently small and said separation length sufficiently large; and
simultaneously, enabling birds outside said at least one access opening to reach their beaks through said at least one access opening far enough to feed on said seed behind said at least one seed opening by making said access opening dimensions sufficiently large and said separation length sufficiently small.

38. The method of claim 37, further comprising the step of providing at least one access tunnel, said at least one access tunnel:
comprising said at least one access opening proximate an outer portion thereof; and:
enveloping said at least one seed opening.

39. The method of claim 38, further comprising the steps of:
providing said separation length to be greater than approximately one inch; and
providing said separation length to be less than approximately one and one half inches.

40. The method of claim 38, said access opening dimensions comprising an access opening width and an access opening length thereof, further comprising the steps of:
providing said access opening width to be greater than approximately seven-eighths of an inch;
providing said access opening width to be less than approximately one and one quarter inches;
providing said access opening length to be greater than approximately seven-eighths of an inch; and
providing said access opening length to be less than approximately one and three quarter inches.

41. The method of claim 38, further comprising the step of:
additionally preventing said rodents from reaching their mouths through said at least one access opening far enough to feed on seed behind said at least one seed opening, using a barring structure of said at least one access tunnel;
by virtue of:
said barring structure reaching a point of maximum protrusion sufficiently distant from said seed opening.

42. The method of claim 41, said access opening dimensions comprising an access opening length thereof, further comprising the steps of:
providing said point of maximum protrusion to be greater than approximately one-quarter of the way from a first end of said access opening toward a second end of said access opening along said access opening length; and providing said point of maximum protrusion to be less than approximately three-quarters of the way from said first end of said access opening toward said second end of said access opening along said access opening length.

43. The method of claim 41, further comprising the steps of:
positioning perching means for at least one bird to perch thereon, relative to said access tunnel, such that:
a bird, while perched thereon, can reach its beak through said at least one access opening of said at least one access tunnel far enough to reach said at least one seed opening and remove said seed; and
positioning said barring structure is relative to said perching means and said access tunnel such that a bird, while perched on said perching means, can also hold onto said barring structure.

44. The method of claim 41, further comprising the step of:
providing a substantially partial rectangular shape for said barring structure.

45. The method of claim 41, further comprising the step of:
providing a substantially partial oval shape for said barring structure.

46. The method of claim 38, further comprising the steps of:
positioning perching means for at least one bird to perch thereon, relative to said access tunnel, such that:
a bird, while perched thereon, can reach its beak through said at least one access opening of said at least one access tunnel far enough to reach said at least one seed opening and remove said seed.

47. The method of claim 38, further comprising the step of:
containing said seed behind said at least one seed opening using a seed holding vessel.

48. The method of claim 47, further comprising the steps of:
substantially vertically orienting said seed holding vessel; and
substantially laterally orienting said at least one access tunnel.

49. The method of claim 48, further comprising the steps of:
providing capping means for maintaining said supply of said seed within said seed holding vessel;
providing a main vessel opening of said seed holding vessel;
introducing a supply of said seed into said seed holding vessel through said main vessel opening by removing capping means from said main vessel opening; and
maintaining said supply of said seed within said seed holding vessel by securing said capping means to said vessel.

50. The method of claim 47, further comprising the step of supporting said vessel from a surface below said vessel using ground stand means for supporting said vessel from a surface below said vessel.

51. The method of claim 50, further comprising the steps of:
moving a ground peg relative to a feeder stand comprising at least three legs;
securing said ground peg relative to said feeder stand; and
connecting said vessel to a base structure comprising said feeder stand and said ground peg so-secured thereto.

52. The method of claim 47, further comprising the step of:
removing and attaching said access tunnel relative to said seed holding vessel, at will.

53. The method of claim 47, further comprised the step of:
accommodating variation is the seed to be employed and variations in the birds to be attracted to the feeder, for a given feeding situation, using interchangeable seed cover;
by:
removing and attaching a first seed cover comprising a first removable seed opening, relative to said seed holding vessel, at will;
removing and attaching a second seed cover comprising a second removable seed opening configured differently from said first removable seed opening, relative to said seed holding vessel, at will.

54. The method of claim 47, further comprising the step of:
monitoring a level of seed remaining in said seed holding vessel using seed level monitoring means for monitoring said level of seed.

55. The method of claim 47, further comprising the step of:
locating said at least one access tunnel substantially outside said seed holding vessel.

56. The method of claim 38, further comprising the steps of:
maintaining an additional supply of said seed in position to replace depleted seed, using a reservoir connected to said seed holding vessel.

57. The method of claim 38, further comprising the step of:
substantially laterally orienting said at least one access tunnel.

58. The method of claim 38, further comprising the step of:
preventing seeds dropped by said birds from pooling in said access tunnel in a location accessible to said rodents;
by:
providing a dropped seed aperture of said access tunnel.

59. The method of claim 38, further comprising the steps of:
restraining seed from falling out through said seed opening; and
minimizing a number of seeds from among said seed which can be removed by a bird on a given seed removal attempt;
by:
providing a suitable shape and size for said at least one seed opening in relation to the seed to be used to feed said birds.

60. The method of claim 38, further comprising the step of:
providing a substantially oval shape for said at least one seed opening.

61. The method of claim 38, further comprising the step of:
substantially providing a keyhole shape for said at least one seed opening.

62. The method of claim 38, further comprising the step of:
substantially providing an oval-shaped center region encircled by a plurality of flanges for said at least one see opening.

63. The method of claim 38, further comprising the step of:

substantially providing an oval-shaped center region encircled by a plurality of slits for said at least one seed opening.

64. The method of claim 38, further comprising the step of:

providing a substantially part-moon shape for said at least one seed opening.

65. The method of claim 38, further comprising the step of:

providing a substantially cloverleaf shape for said at least one seed opening.

66. The apparatus of claim 38, further comprising the step of:

providing at least one barring nub protruding into an interior of said access tunnel.

67. The method of claim 38, further comprising the steps of:

tapering said access tunnel to be wider toward said access opening; and tapering said access tunnel to be narrower toward said seed opening.

68. The method of claim 38, further comprising the steps of:

additionally preventing said rodents from reaching their mouths through said at least one access opening far enough to feed on seed behind said at least one seed opening, using at least one protrusion of said access tunnel;

by virtue of:

said at least one protrusion reaching a point of maximum protrusion sufficiently distant from said seed opening; and viewing a head of a bird while said bird is feeding, using at least one bird viewing recess;

by virtue of:

said at least one bird viewing recess being recessed relative to said protrusion.

69. The method of claim 38, further comprising the steps of:

enabling birds to feed on suet contained by a suet feeder;

by virtue of:

suet feeder openings of said suet feeder being sufficiently large to enable birds to reach their beaks through said suet feeder openings and feed on said suet contained by said suet feeder; and simultaneously, preventing rodents from feeding on said suet contained by said suet feeder;

by virtue of:

said suet feeder openings being sufficiently small to prevent rodents from reaching their mouths through said suet feeder openings and feeding on said suet contained by said suet feeder.

70. The method of claim 38, further comprising the step of:

providing said separation length to be greater than approximately one inch.

71. The method of claim 38, further comprising the steps of:

additionally preventing said rodent from reaching their mouths through said at least one access opening far enough to feed on seed behind said at least one seed opening, using at least one protrusion of said access tunnel;

by virtue of:

said at lest one protrusion reaching a point of maximum protrusion sufficiently distant from said seed opening.

72. The method of claim 37, further comprising the steps of:

providing a first surface comprising said at least one seed opening;

providing a second surface comprising said at least one access opening.

73. A bird feeding apparatus, comprising:

at least one seed opening enabling birds to remove said seed therethrough from behind said at least one seed opening;

at least one access opening comprising access opening dimensions thereof and separated from said seed opening by a separation length therebetween; and at least one access tunnel, said at least one access tunnel:

comprising said at least one access opening; and comprising a barring structure remaining a point of maximum protrusion sufficiently distant from said seed opening to additionally prevent said rodents from reaching their mouths through said at least one access opening far enough to feed on seed behind said at least one seed opening; and enveloping said at least one seed opening;

wherein:

said access opening dimensions are sufficiently small and said separation length is sufficiently large such that rodents outside said at least one access opening are prevented by said at least one access opening from reaching their mouths through said at least one access opening far enough to feed on seed behind said at least one seed opening; and simultaneously, said access opening dimensions are sufficiently large and said separation length is sufficiently small such that birds outside said at least one access opening are enabled to reach their beaks through said at least one access opening far enough to feed on said seed behind said at least one seed opening.

74. The apparatus of claim 73, said access opening dimensions comprising an access opening length thereof, wherein:

said point of maximum protrusion is greater than approximately one-quarter of the way from a first end of said access opening toward a second end of said access opening along said access opening length; and said point of maximum protrusion is less than approximately three-quarters of the way from said first end of said access opening toward said second end of said access opening along said access opening length.

75. The apparatus of claim 73, further comprising:

perching means for at least one bird to perch thereon, said perching means:

positioned related to said access tunnel such that a bird, while perched thereon, can reach its beak through said at least one access opening of said at least one access tunnel far enough to reach said at least one seed opening and remove said seed;

wherein:

said barring structure is positioned relative to said perching means and said access tunnel such that a bird, while perched on said perching means, can also hold onto said barring structure.

76. The apparatus of claim 73, wherein:
said barring structure comprises a substantially partial rectangular shape.

77. The apparatus of claim 73, wherein:
said barring structure comprises a substantially partial oval shape.

78. The apparatus of claim 73, further comprising:
at least one barring nub protruding into an interior of said access tunnel.

79. A method for feeding birds while barring rodents from feeding, comprising the steps of:
providing at least one seed opening enabling birds to remove said seed therethrough from behind said at least one seed opening;
further providing at least one access opening comprising access opening dimensions thereof and separated from said seed opening by a separation length therebetween;
preventing rodents outside said at least one access opening from reaching their mouths through said at least one access opening far enough to feed on seed behind said at least one seed opening, using said access opening, by making said access opening dimensions sufficiently small and said separation length sufficiently large;
simultaneously, enabling birds outside said at least one access opening to reach their beaks through said at least one access opening far enough to feed on said seed behind said at least one seed opening by making said access opening dimensions sufficiently large and said separation length sufficiently small;
providing at least one access tunnel, said at least one access tunnel:
  comprising said at least one access opening proximate an outer portion thereof; and
  enveloping said at lest one seed opening; and
additionally preventing said rodents from reaching their mouths through said at least one access opening far enough to feed on seed behind said at least one seed opening, using a barring structure of said at least one access tunnel;
by virtue of:
  said barring structure reaching a point of maximum protrusion sufficiently distant from said seed opening.

80. The method of claim 79, said access opening dimensions comprising an access opening length thereof, further comprising the steps of:
providing said point of maximum protrusion to be greater than approximately one-quarter of the way from a first end of said access opening toward a second end of said access opening along said access opening length; and
providing said point of maximum protrusion to be less than approximately three-quarters of the way from said first end of said access opening toward said second end of said access opening along said access opening length.

81. The method of claim 79, further comprising the steps of:
positioning perching means for at least one bird to perch thereon, relative to said access tunnel, such that:
  a bird, while perched thereon, can reach its beak through said at least one access opening of said at least one access tunnel far enough to reach said at least one seed opening and remove said seed; and
  positioning said barring structure is relative to said perching means and said access tunnel such that a bird, while perched on said perching means, can also hold onto said barring structure.

82. The method of claim 79, further comprising the step of:
providing a substantially partial rectangular shape for said barring structure.

83. The method of claim 79, further comprising the step of:
providing a substantially partial oval shape for said barring structure.

84. The apparatus of claim 79, further comprising the step of:
providing at least one barring nub protruding into an interior of said access tunnel.

85. A bird feeding apparatus, comprising:
at least one seed opening enabling birds to remove said seed therethrough from behind said at least one seed opening; and
at least one access opening comprising access opening dimensions thereof and separated from said seed opening by a separation length therebetween;
at least one access tunnel, said at least one access tunnel.
  comprising said at least one access opening;
  comprising a dropped seed aperture for preventing seeds dropped by said birds from pooling in said access tunnel in a location accessible to said rodents; and
  enveloping said at least one seed opening;
wherein:
  said access opening dimensions are sufficiently small and said separation length is sufficiently large such that rodents outside said at least one access opening are prevented by said at least one access opening from reaching their mouths through said at least one access opening far enough to feed on seed behind said at least one seed opening; and
  simultaneously, said access opening dimensions are sufficiently large and said separation length is sufficiently small such that birds outside said at least one access opening are enabled to reach their beaks through said at least one access opening far enough to feed on said seed behind said at least one seed opening.

86. A method for feeding birds while barring rodents from feeding, comprising the steps of:
providing at least one seed opening enabling birds to remove said seed therethrough from behind said at least one seed opening;
further providing at least one access opening comprising access opening dimensions thereof and separated from said seed opening by a separation length therebetween;
preventing rodents outside said at least one access opening from reaching their mouths through said at least one access opening far enough to feed on seed behind said at least one seed opening, using said access opening, by making said access opening dimensions sufficiently small and said separation length sufficiently large;
simultaneously, enabling birds outside said at least one access opening to reach their beaks through said at least one access opening far enough to feed on said seed behind said at least one seed opening by making said access opening dimensions sufficiently large and said separation length sufficiently small;

providing at lest one access tunnel, said at least one access tunnel:
comprising said at least one access opening proximate an outer portion thereof; and
enveloping said at least one seed opening; and
preventing seeds dropped by said birds from pooling in said access tunnel in a location accessible to said rodents;
by:
providing a dropped seed aperture of said access tunnel.

87. A bird feeding apparatus, comprising:
at least one seed opening enabling birds to remove said seed therethrough from behind said at least one seed opening; and
at least one access opening comprising access opening dimensions thereof and separated from said seed opening by a separation length therebetween;
at least one access tunnel, said at least one access tunnel; comprising said at least one access opening; and
enveloping said at least one seed opening; and
at least one barring nub protruding into an interior of said access tunnel;
wherein:
said access opening dimensions are sufficiently small and said separation length is sufficiently large such that rodents outside said at least one access opening are prevented by said at least one access opening from reaching their mouths through said at lest one access opening far enough to feed on seed behind said at least one seed opening; and
simultaneously, said access opening dimensions are sufficiently large and said separation length is sufficiently small such that birds outside said at least one access opening are enabled to reach their beaks through said at least one access opening far enough to feed on said seed behind said at least one seed opening.

88. A method for feeding birds while barring rodents from feeding, comprising the steps of:
providing at least one seed opening enabling birds to remove said seed therethrough from behind said at least one seed opening;
further providing at least one access opening comprising access opening dimensions thereof and separated from said seed opening by a separation length therebetween;
preventing rodents outside said at least one access opening from reaching their mouths through said at least one access opening far enough to feed on seed behind said at least one seed opening, using said access opening, by making said access opening dimensions sufficiently small and said separation length sufficiently large;
simultaneously, enabling birds outside said at least one access opening to reach their beaks through said at least one access opening far enough to feed on said seed behind said at least one seed opening by making said access opening dimensions sufficiently large and said separation length sufficiently small;
providing at least one access tunnel, said at least one access tunnel;
comprising said at least one access opening proximate an outer portion thereof; and:
enveloping said at least one seed opening; and
providing at least one barring nub protruding into an interior of said access tunnel.

89. A bird feeding apparatus, comprising:
at least one seed opening enabling birds to remove said seed therethrough from behind said at lest one seed opening; and
at least one access opening comprising access opening dimensions thereof and separated from said seed opening by a separation length therebetween;
at least one access tunnel, said at least one access tunnel:
comprising said at least one access opening;
enveloping said at least one seed opening; and
comprising at least one protrusion;
said at least one protrusion:
reaching a point of maximum protrusion sufficiently distant from said seed opening to additionally prevent said rodents from reaching their mouths through said at lest one access opening far enough to feed on seed being said at least one seed opening;
wherein:
said access opening dimensions are sufficiently small and said separation length is sufficiently large such that rodents outside said at least one access opening are prevented by said at least one access opening from reaching their mouths through said at least one access opening far enough to feed on seed behind said at least one seed opening; and
simultaneously, said access opening dimensions are sufficiently large and said separation length is sufficiently small such that birds outside said at least one access opening are enabled to reach their beaks through said at least one access opening far enough to feed on said seed behind said at least one seed opening.

90. The apparatus of claim 89, further comprising:
at least one bird viewing recess;
said at least one bird viewing recess:
recessed relative to said protrusion for viewing a head of a bird while said bird is feeding.

91. A method for feeding birds while barring rodents from feeding, comprising the steps of:
providing at least one seed opening enabling birds to remove said seed therethrough from behind said at least one seed opening;
further providing at least one access opening comprising access opening dimensions thereof and separated from said see opening by a separation length therebetween;
preventing rodents outside said at least one access opening from reaching their mouths through said at least one access opening far enough to feed on seed behind said at least one seed opening, using said access opening, by making said access opening dimensions sufficiently small and said separation length sufficiently large;
simultaneously, enabling birds outside said at least one access opening to reach their beaks through said at least one access opening far enough to feed on said seed behind said at least one seed opening by making said access opening dimensions sufficiently large and said separation length sufficiently small;
providing at least one access tunnel, said at least one access tunnel:
comprising said at least one access opening proximate an outer portion thereof; and:
enveloping said at least one seed opening; and additionally preventing said rodents from reaching their mouths through said at least one access opening far enough to feed on seed behind said at least one seed opening, using at least one protrusion of said access tunnel;

by virtue of:

said at least one protrusion reaching a point of maximum protrusion sufficiently distant from said seed opening.

92. The method of claim 91, further comprising the step of:

viewing a head of a bird while said bird is feeding using at lest one bird viewing recess;

by virtue of:

said at least one bird viewing recess being recessed relative to said protrusion.

* * * * *